United States Patent
Na et al.

(10) Patent No.: US 9,420,245 B2
(45) Date of Patent: Aug. 16, 2016

(54) AUTO-FOCUSING PROJECTION SYSTEM

(71) Applicant: EVIEO TECHNOLOGY (SHENZHEN) LIMITED, Shenzhen, Guangdong (CN)

(72) Inventors: Qinglin Na, Shenzhen (CN); Yan Huang, Shenzhen (CN); Haohuang Mai, Shenzhen (CN); Haixiang Wang, Shenzhen (CN)

(73) Assignee: PIQS TECHNOLOGY (SHENZHEN) LIMITED, Shenzhen (CN)

( * ) Notice: Subject to any disclaimer, the term of this patent is extended or adjusted under 35 U.S.C. 154(b) by 103 days.

(21) Appl. No.: 14/375,793

(22) PCT Filed: Dec. 26, 2012

(86) PCT No.: PCT/CN2012/087569
§ 371 (c)(1),
(2) Date: Jul. 31, 2014

(87) PCT Pub. No.: WO2014/082362
PCT Pub. Date: Jun. 5, 2014

(65) Prior Publication Data
US 2015/0015854 A1 Jan. 15, 2015

(30) Foreign Application Priority Data
Nov. 30, 2012 (CN) ...................... 2012 2 0651171 U

(51) Int. Cl.
*G03B 21/53* (2006.01)
*H04N 9/31* (2006.01)
*G02B 7/36* (2006.01)
*G06F 3/01* (2006.01)

(52) U.S. Cl.
CPC .................. *H04N 9/317* (2013.01); *G02B 7/36* (2013.01); *G03B 21/53* (2013.01); *G06F 3/01* (2013.01)

(58) Field of Classification Search
CPC ............ G02B 7/36; G03B 21/53; G06F 3/01; H04N 9/317
See application file for complete search history.

(56) References Cited

U.S. PATENT DOCUMENTS 5,400,093 A * 3/1995 Timmers .................. G02B 7/32
348/745

FOREIGN PATENT DOCUMENTS

CN   201226040 Y   4/2009

* cited by examiner

*Primary Examiner* — Sultan Chowdhury
*Assistant Examiner* — Danell L Owens

(57) ABSTRACT

An auto-focusing projection system includes a projection module, an infrared monitoring module (300), an infrared source (400) provided on the projection module, and a focusing device for driving the first lens group (201) moving forward and backward. An IR light spot emitted from the infrared source falls within the monitoring scope of the infrared monitoring module, preferably inside the projected picture of the projection module or on the edge thereof, and after reflected back, it also can travel through the first lens group, and the splitting element in turn, and then be transmitted to the infrared monitoring module. Analyzing the IR light spot picture emitted from the infrared source which is collected by the infrared monitoring module, a control signal can be sent to a focusing motor to adjust the first lens group to an appropriate position, so as to realize auto-focusing.

7 Claims, 4 Drawing Sheets

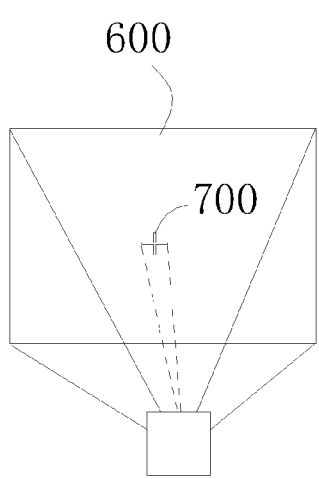
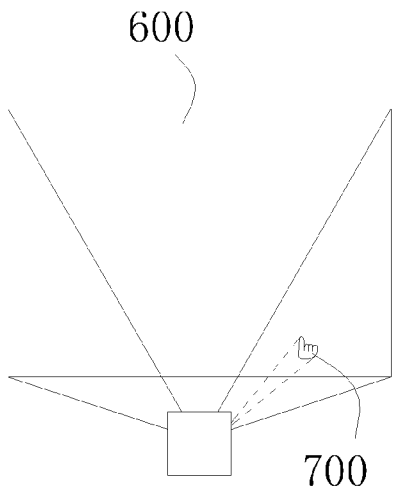
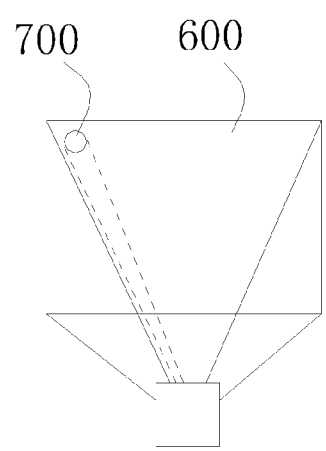
FIG. 6A        FIG. 6B        FIG. 6C
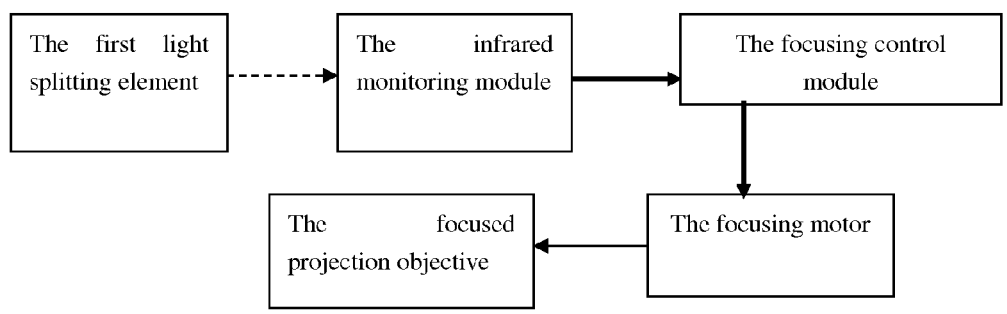
FIG. 7

AUTO-FOCUSING PROJECTION SYSTEM

TECHNICAL FIELD

This invention refers to a projection system, and more particularly to a projection system with functions of auto-focus and infrared monitoring.

BACKGROUND

As shown in FIG. 1, a Chinese Utility Model patent with patent No. 200820071126.8 discloses a "big-screen infrared monitor projection objective" for solving focusing problems of projection objective and infrared monitoring objective, which is provided with two focusing devices, i.e., a projection focusing device 17 and a monitoring focusing device 19. Thus, in this patent, the projection objective and infrared monitoring objective need to be focused separately.

Labels in FIG. 1 represent as follows: single negative lens 1, single negative lens 2, single negative lens 3, single positive lens 4, light splitting prism 5, single positive lens 6, single negative lens 7, balsaming lens 8, balsaming lens 9, single positive lens 10, filter 11, single positive lens 12, single negative lens 13, single positive lens 14, balsaming lens 15, projection lens barrel 16, projection focusing hand wheel 17, flange 18, monitoring focusing hand wheel 19, monitoring lens barrel 20, flange 21, CMOS chip 22, chip fixed plate 23, field diaphragm 24.

When the projection distance changes, the projection focusing device 17 needs to be adjusted to make the projection objective to focus, that is to push "the projection lens barrel 16 and the flange 18 to move telescopically in whole", so as to focus and obtain a clear projection picture. Because the infrared monitoring objective which is mounted on the projection lens barrel 16 moves along at the same time, the focusing device 19 needs to be adjusted to make the infrared monitoring objective to focus, which makes the CMOS chips 22 collect images to meet requirements of interactive operation.

Such type of projection system requires focusing twice, which makes inconvenient in operation; on the other hand, the projection picture is formed by visible light, users can determine whether the focusing is clear by their eyes, but the eyes of users cannot determine whether the requirements of interactive operation is met since the infrared monitoring picture is formed by invisible infrared light.

SUMMARY

For the defects in the art, an object of the present invention is to provide a solution to the problem of a projection system requires which needs focusing twice, and is inconvenient in operation.

A technical solution for solving such problem is as follows:

An auto-focusing projection system includes a projection module and an infrared monitoring module. The projection module comprising a projection light source and a projection objective, light emitted from the projection light source travelling through a light splitting element in the projection objective, and a first lens group in turn, and then emitting out; the infrared monitoring module comprising a monitoring objective and an induction chip, an infrared source provided on the projection module, an IR(infrared) light spots emitted from the infrared source are projected within the monitoring scope of the infrared monitoring module; the IR light of the IR light spots reflected back travelling through the first lens group, the light splitting element in turn, and then into the infrared monitoring module; a focusing device for driving the first lens group moving forward and backward, the focusing device comprising a focusing control module and a focusing motor, the focusing control module receiving a real-time IR monitoring signal from the infrared monitoring module, and emitting a control signal to the focusing motor, the focusing motor being connected to the first lens group driving the first lens group to move back and forth; the optical axis of the infrared monitoring module being coaxial with that of the projection objective after passing through the light splitting element, the optical characteristics of the projection objective and the monitoring objective ensuing that the projection objective focus clearly when the first lens group is driven to move back and forth by the focusing device to make the IR monitoring picture received by the induction chip to be focused clearly.

In the present invention, the projection module and the infrared monitoring module should satisfy the following relations: when the active area of a display chip in the projection module is larger than that of the IR monitoring picture correspondingly formed on the induction chip by the projected picture, the magnification of the monitoring objective is larger than that of an optical system formed from the light splitting element to the display chip; when the active area of a display chip in the projection module is smaller than that of the IR monitoring picture correspondingly formed on the induction chip by the projected picture, the magnification of the monitoring objective is smaller than that of an optical system formed from the light splitting element to the display chip; when the active area of a display chip in the projection module is equal to that of the IR monitoring picture correspondingly formed on the induction chip by the projected picture, the magnification of the monitoring objective is equal to that of an optical system formed from the light splitting element to the display chip.

Further, the optical angle between the light path of IR light on the first lens surface of the first lens group, which is reflected from the projection plane and then enters the induction chip to form the IR monitoring picture, should be larger than or equal to the emergent light angle of a projection light on the first lens surface.

In the present invention, the projection objective is further provided with a second lens group, the light splitting element is arranged between the first lens group and the second lens group; both the second lens group and the light splitting element are fixed structures; the light emitted from the projection source travels through the second lens group, the light splitting element, and the first lens group in turn, and then emits out.

In the present invention, the light splitting element comprises two mutually bonded right-angle prisms, a light splitting film is provided on a bonding interface of the two right-angle prisms. Alternatively, the light splitting element is a light splitting sheet.

In the present invention, a light spot emitted from the infrared monitoring module should keep clear at any distance within the scope of a working distance, such that it is eligible for being a reference during focusing. In addition, the emergent light angle of the infrared source should be less than 2 degree. The infrared source further comprises a collimated laser source.

In the present invention, the IR light emitted from the infrared source should falls on the edge of the projected picture preferably.

The auto-focusing projection system according the present invention has the following advantages: As the first lens group can meet the focusing requirements of both the projection objective and the infrared monitoring module, when the IR light spot emitted from the infrared source is focused clearly on the induction chip, the projected picture is focused clearly simultaneously, that is, when the IR light spot is focused via the focusing device, the focusing of the projection picture is realized simultaneously, so as to realize auto-focusing and facilitate usage, moreover; and as the infrared monitoring module and the projection module share one set of imaging system, the induction area of the induction chip on the infrared monitoring picture is fixed, and will not vary with the projected picture, such that an interactive algorithm does not need to be re-calibration the monitoring point position.

BRIEF DESCRIPTIONS OF THE DRAWINGS

The present invention will be further illustrated combining with the following accompanying drawings and embodiments, in the figures:

FIG. 6A, FIG. 6B and FIG. 6C show IR light spots with different shapes and different sites relative to the projection picture;

FIG. 7 is a schematic diagram of focusing according an embodiment of the present invention.

DETAILED DESCRIPTION OF EMBODIMENTS

Figure 1:
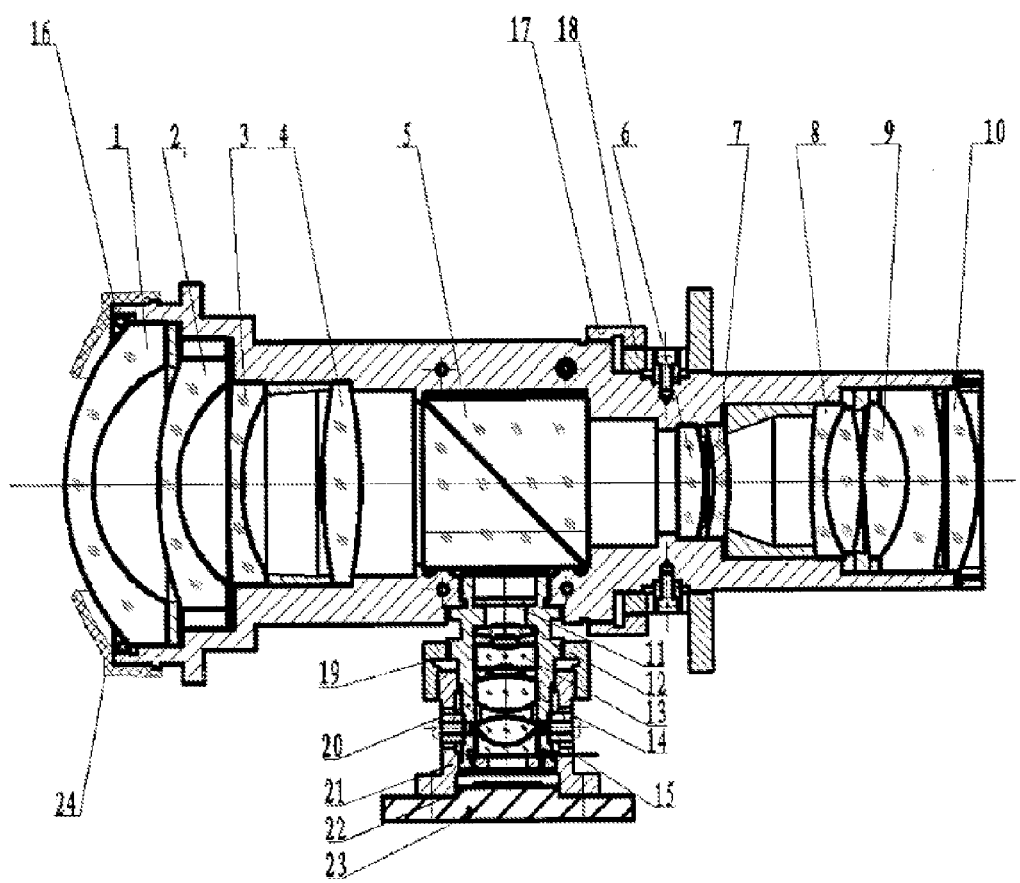
FIG. 1 is a schematic view of a projection system in the art.
Figure 2:
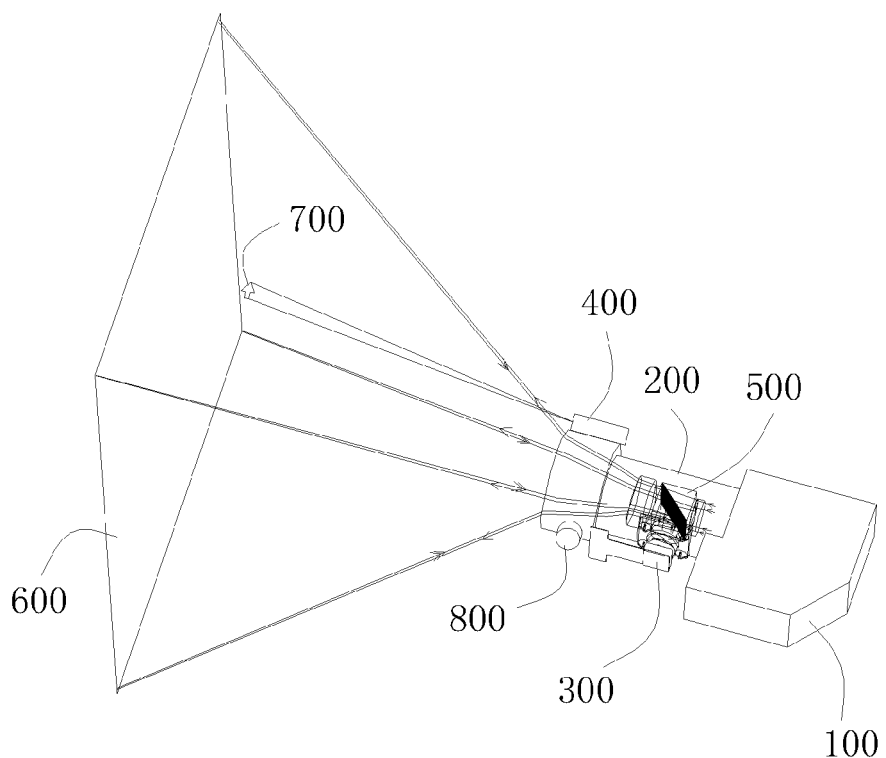
FIG. 2 is a schematic view of a projection system according to an embodiment of the invention.

Referring to FIG. 2, according to the first embodiment of the present invention, an auto-focusing projection system includes a projection module, an infrared monitoring module 300, an infrared light source 400, and a focusing device. The infrared monitoring module 300 includes a monitoring objective, and an induction chip 301 mounted in the monitoring objective. Light spot 700 emitted from the infrared source 400 should keep clear at any position within the scope of a working distance, such that it can be a reference for focusing. In addition, a light angle of the infrared source 400 should be less than 2 degrees. The infrared source 400 further includes a collimated laser source.

Figure 3:
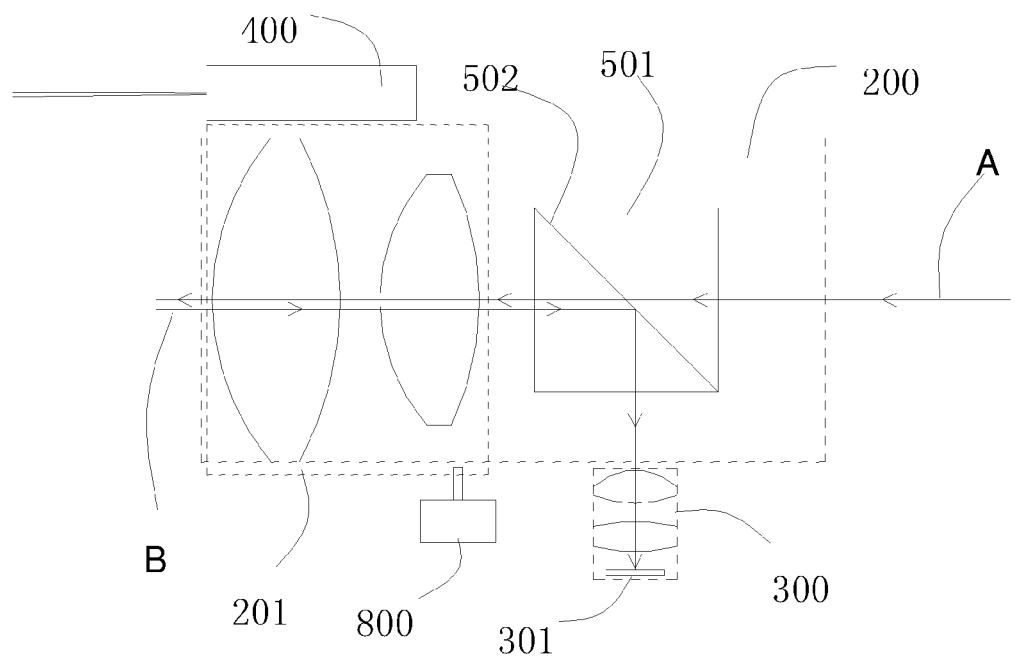
FIG. 3 is a schematic view of a projection objective and an infrared source of the projection system shown in FIG. 2.

As shown in FIG. 3, the projection module further includes a projection light source 100, and a projection objective 200 connected to the projection light source 100. The projection objective 200 includes a housing, a first lens group 201 received in the housing, and a light splitting element 500 for reflecting infrared light and transmitting of visible light. The light splitting element 500 is arranged at the rear of the first lens group 201.

Figure 4:
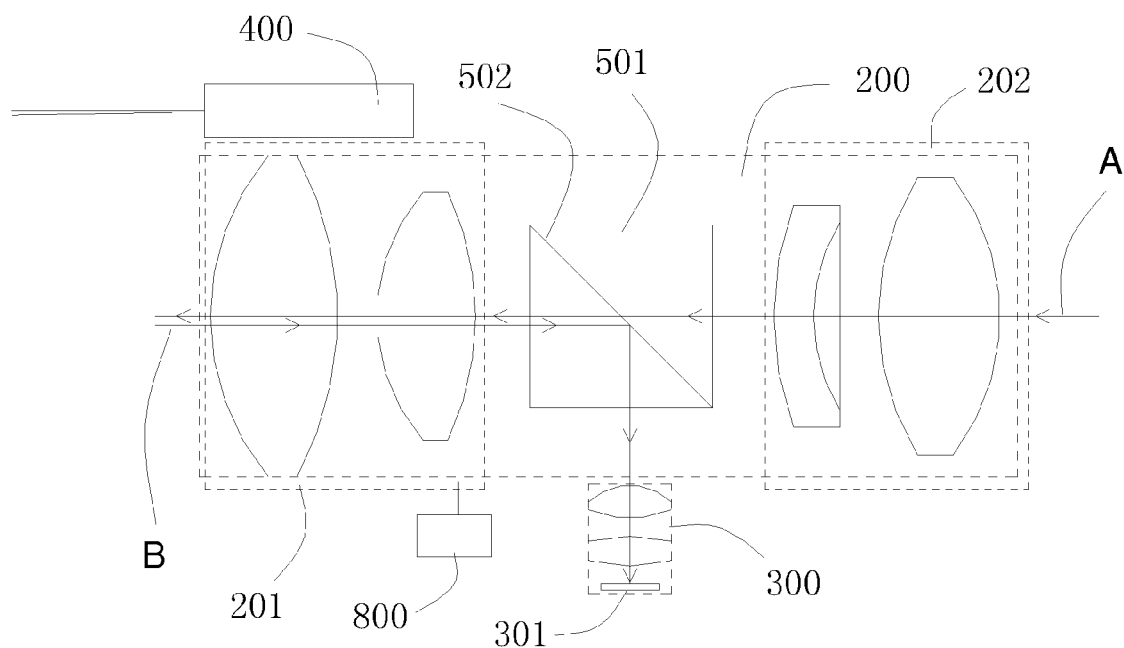
FIG. 4 is a schematic view of a projection objective and an infrared source of a projection system according a second embodiment of the present invention.

As shown in FIG. 4, in the second embodiment of the present invention, which has a working principle the same as that of the first embodiment, and different in that, the projection objective 200 includes a second lens group 202 at the rear of the light splitting element, and the light splitting element 500 is arranged between the first lens group 201 and the second lens group 202. The second lens group 202 and the light splitting element 500 both are fixed structures. Light emitted from the projection light source 100 travels through the second lens group 202, the light splitting element 500, and the first lens group 201 in turn, and then emits out. After being reflected back, the IR light emitted from the infrared source 400 travels through the first lens group 201 and the light splitting element 500 in turn, and then to the infrared monitoring module 300.

Light beams emitted out from the projection light source 100 are projected on a projection plane 600 after through the projection objective 200. During projecting, visible light rays (shown as A in FIGS. 3 and 4) can pass through the light splitting element 500 in the projection objective 200 right-to-left directly, such that the projected image of visible light rays can pass though the light splitting element 500 directly and then be projected on the projection plane 600, meanwhile, when the IR rays (shown as B in FIGS. 3 and 4) on the projection plane 600 travels through the first lens group 201 to the light splitting element 500, the IR rays are reflected into the infrared monitoring module 300.

The focusing device includes a focusing control module and a focusing motor 800. An induction chip 301 and the focusing motor 800 are both electrically connected to the focusing control circuit. The focusing control module receives a real-time IR monitoring signal from the infrared monitoring module 300, and emits a control signal to the focusing motor 800. The focusing motor 800 is connected to the first lens group 201 and can drive the first lens group 201 moving forward and backward inside the housing. The infrared monitoring module 300 is connected to the projection objective 200, and the optical axis of the infrared monitoring module 300 is coaxial with that of the projection objective after passing through the light splitting element 500. In this embodiment, the optical characteristics of the projection objective 200 and the monitoring objective can ensure that the projection objective 200 focus clearly when the first lens group 201 is driven to move forward and backward by the focusing device to make the IR monitoring picture received by the induction chip 301 to focus clearly. The light path characteristics for synchronous focusing are shown as follows: when the active area of a display chip in the projection module is larger than that of the IR monitoring picture correspondingly formed on the induction chip 301 by the projected picture, the magnification of the monitoring objective is larger than that of an optical system formed from the light splitting element 500 to the display chip; when the active area of a display chip in the projection module is smaller than that of the IR monitoring picture correspondingly formed on the induction chip 301 by the projected picture 600, the magnification of the monitoring objective is smaller than that of an optical system formed from the light splitting element 500 to the display chip; when the active area of a display chip in the projection module is equal to that of the IR monitoring picture correspondingly formed on the induction chip 301 by the projected picture 600, the magnification of the monitoring objective is equal to that of an optical system formed from the light splitting element 500 to the display chip. Herein, the projected picture is referred to a projection plane occupied by the projected image formed on the projection plane 600.

In the previous embodiments, in order to ensure the IR monitoring without blind spots, the optical angle of the light path of IR light on the first lens surface of the first lens group, which is reflected back from the projection plane 600 into the induction chip 301 and forms the IR monitoring picture, should be larger than or equal to the emitting angle of a projection light at the first lens surface.

Figure 5A:
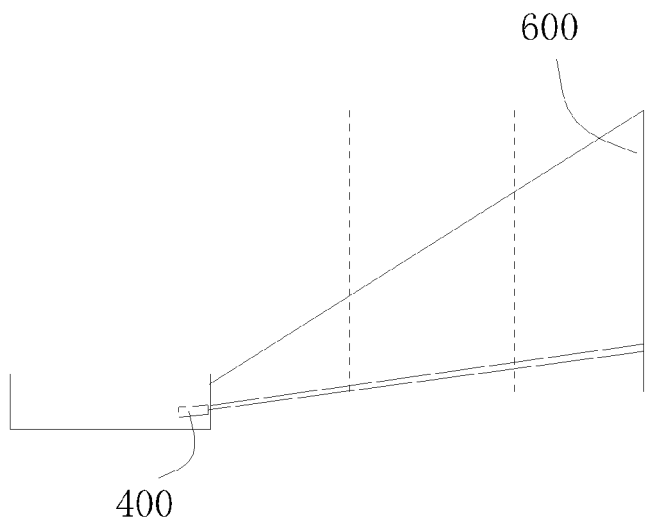
FIGS. 5A and 5B show sites of the IR light spot emitted from the infrared source relative to the projection picture.
Figure 5B:
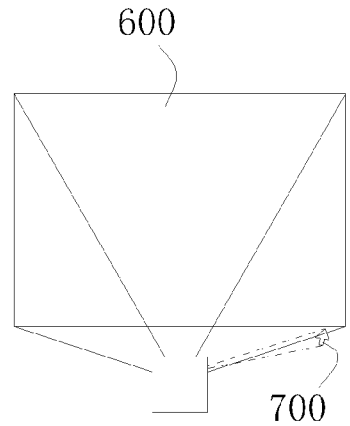

IR light spot 700 emitted from the infrared source 400 has any bounded shape, and can fall on any sites within the monitoring scope of the infrared monitoring module 300, such as the interior of the projected picture, as shown in FIGS. 6A, 6B, and 6C. In order to avoid disturbing other interacting operations, in another embodiment, the IR light spot 700 falls on the periphery of the projected picture 600 and is adjacent to the boundary of the projected picture, which means at the edge of the projected picture, as shown in FIGS. 5A, 5B. The IR light spot 700 emitted from the infrared source 400 can also be projected on a site apart from the projected picture with a distance, as long as it still falls within the monitoring scope of the infrared monitoring module 300.

Since the light spot 700 emitted from the infrared source 400 is clear at any site within the working distance of the projection objective, when the projected picture 600 doesn't focus, the picture of the IR light spot 700 collected by the infrared monitoring module 300 is unclear, the focusing control circuit thus analyzes the image in the infrared monitoring objective, and sends a signal to make the auto-focusing motor 800 to drive the first lens group 201 moving forward and backward till the infrared monitoring module 300 collects clear picture. As the first lens group 201 can meet the focusing requirements of both the projection objective 200 and the infrared monitoring objective 300, the projected picture 600 will also become clear, such that auto-focusing is realized.

The advantages of the present invention is that, the projected plane 600 is coincided with an IR monitoring screen, the IR light spot 700 keeps clear within the working distance of the projection objective. As the first lens group 201 can meet the focusing requirements of both the projection objective 200 and the infrared monitoring module 300, when the IR light spot 700 is focused clearly on the induction chip 301, the projected picture 600 is focused clearly simultaneously, so as to realize auto-focusing and facilitate usage. As the infrared monitoring module 300 and the projection module 200 share one set of imaging system, the induction area of the projected picture 600 on the induction chip 301 is fixed, and will not change with the projected picture 600, such that an interactive algorithm does not need to be re-calibration a monitoring point position.

Preferably, the light splitting element 500 can be a light splitting prism. Furthermore, the light splitting prism includes two right-angle prisms 501 bonding together (as shown in FIG. 3), and a light splitting film 502 provided on the bonding interface of the two right-angle prisms 501. The light splitting element 500 can also be a splitter, with a working principle the same as that of the two mutually bonded right-angle prisms 501.

The working principle of the auto-focusing is shown as follows: the IR light spot (or picture) of the infrared source 400 is clear at any site, if the projected picture is not focused, the IR light spot (or picture) on the projection screen collected by the infrared monitoring module is unclear, an image algorithm in the auto-focusing control circuit will analyze the image in the infrared monitoring objective, and send a signal to make the auto-focusing motor drive the first lens group to move forward and backward until the image collected by the infrared monitoring module becomes clear. For a particular projection system, as the infrared source is fixed and the IR light spot is also fixed, whether the clear requirements are met can be determined by comparing with prestored IR light spot picture. As the first lens group can meet the focusing requirements of both the projection objective and the infrared monitoring objective, the projected picture will also become clear, such that auto-focusing is realized.

The working principle of the auto-focusing device is shown in FIG. 7, the focusing device includes a focusing control module and a focusing motor. The focusing control module receives a real-time IR monitoring signal from the infrared monitoring module 300 (an electrical signal indicated by thick lines), and emits a control signal to the focusing motor, which is connected to and driven to move forward and backward by the focused projection objective The embodiment of the present invention as shown in FIGS. 3 and 4, the focusing motor drives the first lens group 201 to move forward and backward.

It should be understood that improvement or alternations can be made according to the above mentioned descriptions for one of the ordinary skill in the art, without departing from the scope of the claims appended in the present invention.

What is claimed is:

1. An auto-focusing projection system comprising:
a projection module comprising a projection light source (100) and a projection objective (200), light emitted from the projection light source (100) traveling through a light splitting element (500) in the projection objective (200) and a first lens group (201) in turn, and then emitting out;
an infrared monitoring module (300) comprising a monitoring objective and an induction chip (301),
an infrared source (400) provided on the projection module, an IR light spot (700) emitted from the infrared source (400) falling within the monitoring scope of the infrared monitoring module (300), an IR light of the IR light spot (700) reflected back travelling through the first lens group (201), the light splitting element (500) in turn, and then into the infrared monitoring module (300);
a focusing device for driving the first lens group (201) moving forward and backward, the focusing device comprising a focusing control module and a focusing motor, the focusing control module receiving a real-time IR monitoring signal from the infrared monitoring module (300), and emitting a control signal to the focusing motor, the focusing motor being connected to the first lens group (201) driving the first lens group (201) to move forward and backward;
the optical axis of the infrared monitoring module (300) being coaxial with that of the projection objective (200) after passing through the light splitting element (500), the optical characteristics of the projection objective (200) and the monitoring objective ensuing that the projection objective focus clearly when the first lens group (201) is driven to move forward and backward by the focusing device to make the IR monitoring picture received by the induction chip (301) to be focused clearly;
wherein, the projection objective (200) comprises a second lens group (202), and the light splitting element (500) is arranged between the first lens group (201) and the second lens group (202); both the second lens group (202) and the light splitting element (500) are fixed structures; the light emitted from the projection source (100) travels through the second lens group (202), the light splitting element (500), and the first lens group (201) in turn, and then emits out.

2. The auto-focusing projection system according to claim 1, wherein, the projection module and the infrared monitoring module (300) satisfies:
when the active area of a display chip in the projection module is larger than that of the IR monitoring picture correspondingly formed on the induction chip (301) by the projected picture, the magnification of the monitoring objective is larger than that of an optical system comprising from the light splitting element (500) to the display chip;
when the active area of a display chip in the projection module is smaller than that of the IR monitoring picture correspondingly formed on the induction chip (301) by the projected picture, the magnification of the monitoring objective is smaller than that of an optical system comprising from the light splitting element (500) to the display chip; and when the active area of a display chip in the projection module is equal to that of the IR monitoring picture correspondingly formed on the induction chip (301) by the projected picture, the magnification of the monitoring objective is equal to that of an optical system comprising from the light splitting element (500) to the display chip.

3. The auto-focusing projection system according to claim 2, wherein, the optical angle of the light path of IR light on the first lens surface of the first lens group (201), which is reflected back from the projection plane (600) and enters the induction chip (301) to form the IR monitoring picture, is larger than or equal to the emergent light angle of a projection light on the first lens surface.

4. The auto-focusing projection system according to claim 1, wherein, the light splitting element (500) comprises two mutually bonded right-angle prisms (501), and a light splitting film (502) provided on a bonding interface of the two right-angle prisms (501).

5. The auto-focusing projection system according to claim 1, wherein, the light splitting element (500) is a splitter.

6. The auto-focusing projection system according to claim 1, wherein, the emergent light angle of the infrared source (400) is less than 2 degrees.

7. The auto-focusing projection system according to claim 6, wherein, the infrared source (400) comprises a collimated laser source.

* * * * *